US008732410B2

(12) United States Patent
Lepak et al.

(10) Patent No.: US 8,732,410 B2
(45) Date of Patent: May 20, 2014

(54) METHOD AND APPARATUS FOR ACCELERATED SHARED DATA MIGRATION

(75) Inventors: Kevin M. Lepak, Austin, TX (US); Vydhyanathan Kalyanasundharam, San Jose, CA (US); William A. Hughes, San Jose, CA (US); Benjamin Tsien, Fremont, CA (US); Greggory D. Donley, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 485 days.

(21) Appl. No.: 12/962,156

(22) Filed: Dec. 7, 2010

(65) Prior Publication Data

US 2012/0144122 A1 Jun. 7, 2012

(51) Int. Cl.
*G06F 12/08* (2006.01)
(52) U.S. Cl.
USPC ............................ 711/144; 711/145; 711/146
(58) Field of Classification Search
None
See application file for complete search history.

(56) References Cited

U.S. PATENT DOCUMENTS

| | | | | |
|---|---|---|---|---|
| 6,981,097 | B2* | 12/2005 | Martin et al. | 711/130 |
| 7,373,466 | B1* | 5/2008 | Conway | 711/156 |
| 8,145,847 | B2* | 3/2012 | Van Doren et al. | 711/141 |
| 2009/0327616 | A1 | 12/2009 | Conway et al. | |

OTHER PUBLICATIONS

P. Stenstrom, M. Brorsson, and L. Sandberg, "An Adaptive Cache Coherence Protocol Optimized for Migratory Sharing," Proceedings of the 20th Annual International Symposium on Computer Architecture, San Diego, CA, pp. 109-118, May 1993.
M. M. K. Martin, Token Coherence, Dissertation for Doctor of Philosophy (Computer Sciences), University of Wisconsin-Madison, 2003, 200 pages.
P. Conway, N. Kalyanasundharam, G. Donley, K. Lepak, B. Hughes, (Advanced Micro Devices), Cache Hierarchy and Memory Subsystem of the AMD Opteron Processor, IEEE Computer Society, 2010, 14 pages.
A. L. Cox and R. J. Fowler, "Adaptive Cache Coherency for Detecting Migratory Shared Data," Proceedings of the 20th Annual International Symposium on Computer Architecture, pp. 98-108, May 1993.
D. Jhalani and D. Palsetia, "Adaptive Cache Coherence Protocol Using Migratory Shared Data," Department of Electrical and Computer Engineering, University of Wisconsin-Madison, 2007, pp. 1-14.

* cited by examiner

*Primary Examiner* — Gary Portka
(74) *Attorney, Agent, or Firm* — Volpe and Koenig, P.C.

(57) ABSTRACT

A method and apparatus for accelerated shared data migration between cores. Using an Always Migrate protocol, when a migratory probe hits a directory entry in either modified or owned state, the entry is transitioned to an owned state, and a source done command is sent without sending cache block ownership or state information to the directory.

8 Claims, 6 Drawing Sheets

METHOD AND APPARATUS FOR ACCELERATED SHARED DATA MIGRATION

BACKGROUND

In modern processors, one or more processor cores may be included in the processor, wherein each processor core is capable of executing instructions in a superscalar pipeline. The processor may be coupled to one or more levels of a cache hierarchy in order to reduce the latency of the processor's request of data in memory for a read or a write operation. Generally, a cache may store one or more blocks of data, each of which is a copy of data stored at a corresponding address in the system memory. As used herein, a "block" is a set of bytes stored in contiguous memory locations, and the set of bytes stored in contiguous memory are treated as a unit for coherency purposes. In some embodiments, a block may also be the unit of allocation and de-allocation in a cache. The number of bytes in a block may be varied according to design choice, and may be of any size. As an example, 32 byte and 64 byte blocks are often used.

In order to increase computing performance, a computing system may increase parallel processing by using subsystems such as processing nodes, each node including one or more processors. Each processor within a processing node, or node, may have its own cache hierarchy. Also, each node may have a higher level of cache hierarchy shared among multiple processors. For example, in one embodiment, a node may comprise two processors, each with a corresponding level one (L1) cache. The node may have an L2 cache shared by the two processors. A memory controller or other interface may couple each node to other nodes in the computing system, to a higher level of cache hierarchy, such as a L3 cache, shared among the multiple nodes, and to dynamic random-access memory (DRAM), dual in-line memory modules (dimms), a hard disk, or otherwise. In alternative embodiments, different variations of components and coupling of the components may be used.

Since a given block may be stored in one or more caches, and further since one of the cached copies may be modified with respect to the copy in the memory system, computing systems often maintain coherency between the caches and the memory system. Coherency is maintained if an update to a block is reflected by other cache copies of the block according to a predefined coherency protocol. Various specific coherency protocols are well known.

Many coherency protocols include the use of messages, or probes, passed from a coherency point, such as a memory controller, to communicate between various caches within the computing system. A coherency point may transmit probes in response to a command from a component (e.g., a processor) to read or write a block. Probes may be used to determine if the caches have a copy of a block and optionally to indicate the state into which the cache should place the block. Each probe receiver responds to the probe, and once all probe responses are received the command may proceed to completion.

Computer systems generally employ either a broadcast cache coherency protocol or a directory based cache coherency protocol. In a system employing a broadcast protocol, probes are broadcast to all processors (or cache subsystems). When a subsystem having a shared copy of data observes a probe resulting from a command for exclusive access to the block, its copy is typically invalidated. Likewise, when a subsystem that currently owns a block of data observes a probe corresponding to that block, the owning subsystem typically responds by providing the data to the requester and invalidating its copy, if necessary.

In contrast, systems employing directory based protocols maintain a directory containing information indicating the existence of cached copies of data. Rather than unconditionally broadcasting probes, the directory information is used to determine particular subsystems (that may contain cached copies of the data) to which probes need to be conveyed in order to cause specific coherency actions. For example, the directory may contain information indicating that various subsystems contain shared copies of a block of data. In response to a command for exclusive access to that block, invalidation probes may be conveyed to the sharing subsystems. The directory may also contain information indicating subsystems that currently own particular blocks of data. Accordingly, responses to commands may additionally include probes that cause an owning subsystem to convey data to a requesting subsystem. Numerous variations of directory based cache coherency protocols are known.

Since probes must be broadcast to all other processors in systems that employ broadcast cache coherency protocols, the bandwidth associated with the network that interconnects the processors can quickly become a limiting factor in performance, particularly for systems that employ large numbers of processors or when a large number of probes are transmitted during a short period. In addition to a possible bandwidth issue, latency of memory accesses may increase due to probes. For example, when a processor performs a memory request that misses in the processor's cache hierarchy, the required data may be retrieved from DRAM and returned to the memory controller prior to the completion of all the probes. Since the data cannot be used by the requesting processor until both the data and probe responses are returned, the probe response latency may become the critical path. Therefore, the latency of memory accesses increases.

Directory based protocols reduce the number of probes contributing to network traffic by conditionally sending probes, rather than unconditionally sending them. Therefore, systems employing directory based protocols may attain overall higher performance due to lessened network traffic and reduced latencies of memory requests. However, while directory based systems may allow for more efficient cache coherency protocols, additional hardware is often required.

The directory based protocol often includes a directory cache that may be implemented on an Application Specific Integrated Circuit (ASIC) or other semi-custom chip separate from the processor. When the directory cache is implemented on a separate chip, the overall cost of the system may increase, as well as board requirements, power consumption, and cooling requirements. On the other hand, incorporation of a directory cache on the same chip as the processor core may be undesirable, particularly for commodity processors intended for use in both single processor or multiple processor systems. When used in a single processor system, the directory cache would go unused, thus wasting valuable die area and adding cost due to decreased yield.

In another alternative, directory entries are stored in designated locations of a cache memory subsystem, such as an L2 cache, associated with a processor core. For example, a designated way of the cache memory subsystem may be allocated for storing directory entries, while the remaining ways of the cache are used to store normal processor data. In one particular implementation, directory entries are stored within the cache memory subsystem to provide indications of lines (or blocks) that may be cached in modified, exclusive, or owned coherency states. The absence of a directory entry for a particular block may imply that the block is cached in either shared or invalid states. Further details may be found in P. Conway, "Computer System with Integrated Directory and Processor Cache," U.S. Pat. No. 6,868,485.

However, this alternative is not able to provide a high coverage ratio without occupying a significant portion of a frequently used cache. If a significant portion is used for the directory, then fewer lines for data may be used within the cache. Therefore, more cache misses, such as capacity and conflict misses, may occur. In order to reduce the amount of cache space to use for the directory, lines with certain states may be determined to not be cached. However, the absence of a directory entry for a block may cause probes to be sent and increase network traffic.

In one scenario, migratory sharing arises when data that is being accessed by multiple central processing unit (CPU) cores moves between CPUs (for example, as with a read followed by write pattern), where one CPU does a read and write, then a second CPU does a read and write, and so on. In the described scenario, the data is not actually being accessed by two CPUs at the same point in time. Thus, it is said to be "migrating" around the system.

Conventional techniques exist for exploiting migratory data patterns via the concept of a special cache state and coherence transactions. However, these conventional solutions assume precise directory state tracking, and thus may send a directed invalidating probe for a sequence of transactions. Additionally, previous solutions required specific tracking of the sharing patterns, information exchange between the directory and caches, and a non-atomic directory lookup and update procedure. Because these approaches assumed cache state feedback, implementation and desirability of the protocol was significantly complicated.

SUMMARY OF EMBODIMENTS OF THE INVENTION

A method and apparatus for accelerated shared data migration between cores are disclosed.

In one embodiment, an Always Migrate protocol (i.e., a directory and broadcast protocol optimized for migratory sharing which always forces ownership of the block to migrate to the current requester regardless of the probe target processor's cache state, described more fully below) facilitates implementation of accelerated shared data migration between cores with a directory protocol. A directory (probe filter) hit in a certain state (for example, modified (M) or owned (O)) for a read block (Rdblk) command may always lead to a Migratory Probe (ProbeMig) and such entries may always transition to the O state in the directory. When the ProbeMig hits M, O, exclusive (E), or ModifiedUnWritten (Muw) state lines in caches, the "ownership" of the line always moves; that is, the new requester gets the line in either Muw or O state, and leaves either an Invalid line (I) state or a shared (S) state copy behind. No information about the target cache state must be relayed to coherence directory in order to keep the directory and cache states consistent. This considerably eases protocol and directory implementation complexity.

This also implies that the O state in the directory may hide a number of potentially unexpected cache states (Muw, M), which is not possible in conventional systems. Thus, additional pieces of status information are sent to the directory on M/Muw/E/O evictions (for example, the cache state of the eviction, including the precise type of eviction, e.g., whether it was a was M/Muw/E/O or many combined evictions) so that the O directory state may be cleaned up appropriately (transition properly at the coherence directory from O->I or O->S).

BRIEF DESCRIPTION OF THE DRAWINGS

A more detailed understanding may be had from the following description, given by way of example in conjunction with the accompanying drawings wherein.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Embodiments of the techniques described herein allow for atomic lookup and update of the directory (without cache state feedback to perform the directory update) while still maintaining the desirable performance properties of previous solutions.

Advantages of certain embodiments include the following:

(1) No cache state feedback is required for a directory update. This improves ease of implementation and advances the state of the art.

(2) Embodiments of the disclosed techniques are compatible with shared caches without directory update, which was not possible in the previous state-of-the-art.

Figure 1:
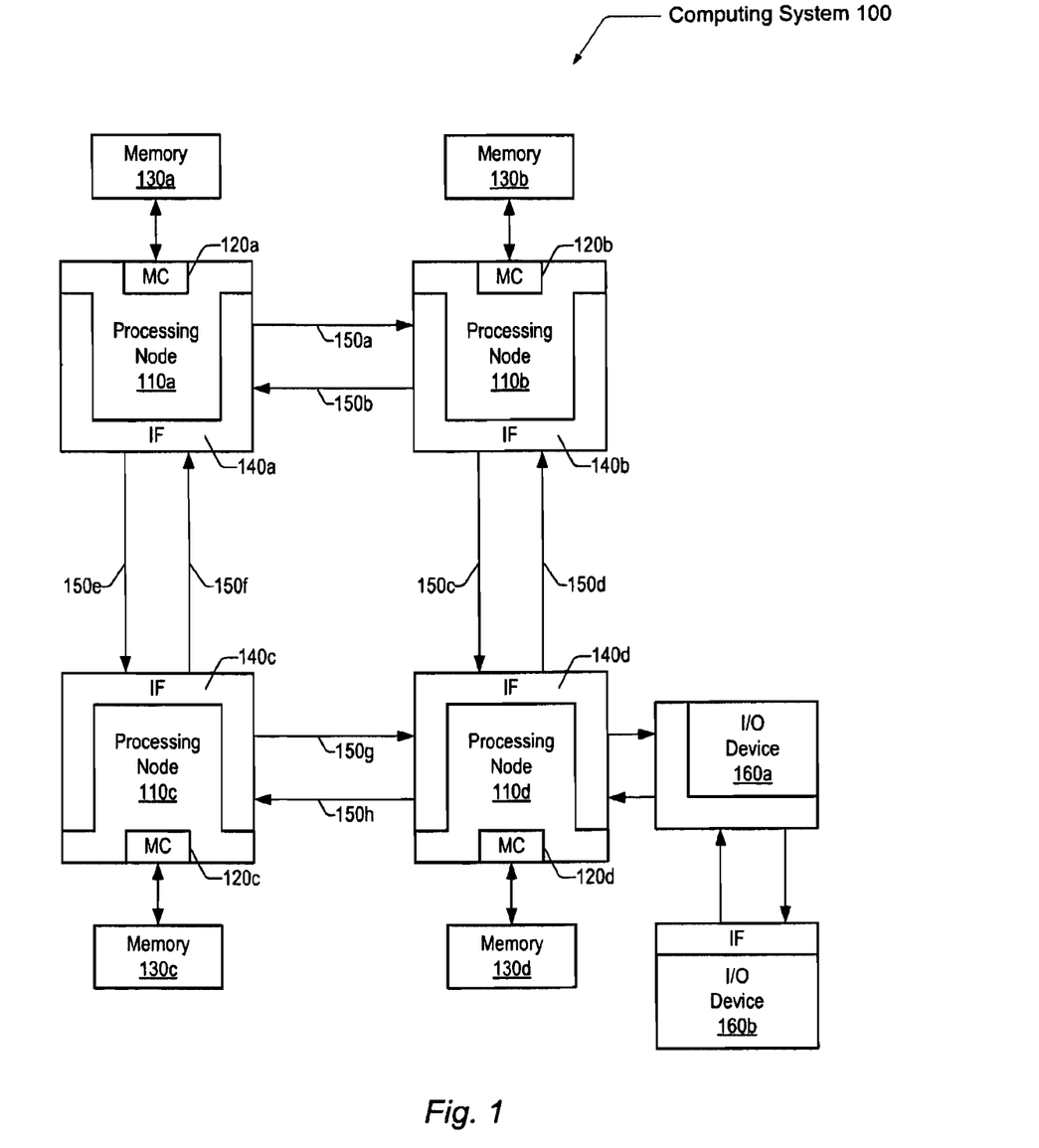
FIG. 1 is a generalized block diagram illustrating one embodiment of a computing system.

Referring to FIG. 1, one embodiment of a computing system 100 is shown. Computing system 100 includes a plurality of processing nodes 110a-110d. Although four nodes are shown in FIG. 1, other embodiments may comprise a different number of nodes each comprising one or more processor cores. As used herein, elements referred to by a reference numeral followed by a letter may be collectively referred to by the numeral alone. For example, processing nodes 110a-110d may be collectively referred to as processing nodes 110, or nodes 110. Each node 110 may be coupled to a respective memory 130 via a respective memory controller 120. Additionally, each processing node 110 may include interface logic 140 used to communicate with others of the processing nodes 110. For example, processing node 110a includes interface logic 140a for communicating with processing nodes 110b and 110c. Similarly, processing node 110b includes interface logic 140b for communicating with processing nodes 110a and 110d, and so on. In the embodiment of FIG. 1, processing node 110d is shown coupled to communicate with an input/output (I/O) device 160a via interface logic 140d, and I/O device 160a is further coupled to a second I/O device 160b. Other processing nodes may communicate with other I/O devices in a similar fashion. Alternatively, a processing node may communicate with an I/O bridge, which is coupled to an I/O bus.

Computing system 100 may implement a packet-based link for inter-node communication. In the depicted embodiment, the link is implemented as sets of unidirectional lines (e.g., lines 150a are used to transmit packets from processing node 110a to processing node 110b, and lines 150b are used to transmit packets from processing node 110b to processing node 110a). Other sets of lines 150c-150h are used to transmit packets between other processing nodes as illustrated in FIG. 1. The link may be operated in a cache coherent fashion for communication between processing nodes or in a non-coherent fashion as a daisy-chain structure between I/O devices 160a-160b (and additional I/O devices, as desired). It is noted that a packet to be transmitted from one processing node 110 to another may pass through one or more intermediate nodes. For example, a packet transmitted by processing node 110a to processing node 110d may pass through either processing node 110b or processing node 110c as shown in FIG. 1. Any suitable routing algorithm may be used. Other embodiments of computing system 100 may include more or fewer processing nodes than the embodiment shown in FIG. 1. In addition, other embodiments are possible in which each processing node is coupled to every other processing node through a point-to-point network.

In addition to the depicted memory controller and interface logic, each processing node 110 may include one or more processors and associated caches, as described further below. Broadly speaking, a processing node 110 comprises at least one processor and may optionally include a memory controller for communicating with a memory and other logic, as desired.

Memories 130 may comprise any suitable memory devices. For example, a memory 130 may comprise one or more RAMBUS dynamic random access memories (DRAMs), synchronous DRAMs (SDRAMs), DRAMs, static RAMs, etc. The address space of computing system 100 is divided among memories 130. Each processing node 110 may include a memory map used to determine which addresses are mapped to which memories 130, and hence to which processing node 110 a memory request for a particular address should be routed. In one embodiment, the coherency point for an address within computing system 100 is the memory controller 120 coupled to the memory storing bytes corresponding to the address. Memory controllers 120 may comprise control circuitry for interfacing to memories 130. Additionally, memory controllers 120 may include request queues for queuing memory requests.

Generally, interface logic 140 may comprise buffers for receiving packets from the link and for buffering packets to be transmitted upon the link. Computing system 100 may employ any suitable flow control mechanism for transmitting packets. I/O devices 160 are illustrative of any desired peripheral devices. For example, I/O devices 160 may comprise network interface cards, video accelerators, audio cards, hard or floppy disk drives or drive controllers, Small Computer Systems Interface (SCSI) adapters and telephony cards, modems, sound cards, and a variety of data acquisition cards such as General Purpose Interface Bus (GPIB) or field bus interface cards.

Figure 2:
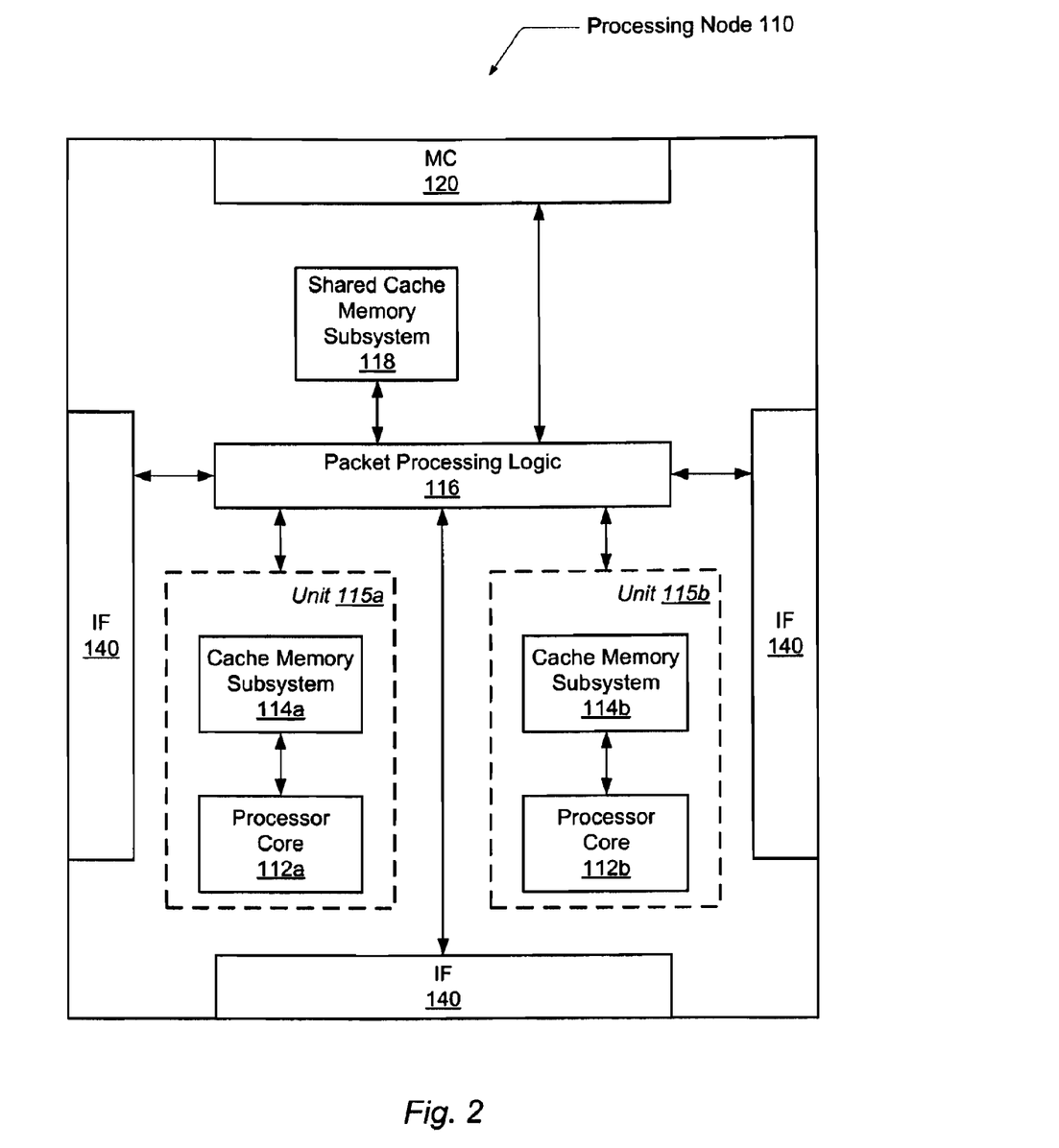
FIG. 2 is a generalized block diagram illustrating one embodiment of an example processing node.

FIG. 2 is a block diagram of one embodiment of an exemplary processing node 110. Circuit portions that correspond to those of FIG. 1 are numbered identically. Processing node 110 may include memory controller 120, interface logic 140, one or more processing units 115, which may include a processor cores 112 and a corresponding cache memory subsystems 114; packet processing logic 116, and a shared cache memory subsystem 118. In one embodiment, the illustrated functionality of processing node 110 is incorporated upon a single integrated circuit.

Generally, packet processing logic 116 is configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic 116.

Upon receiving a request from a CPU/core, the memory controller uses a probe to retrieve data from and/or modify the state of that line in other caches in the system. It is part of the process of fulfilling a core request and allowing it to have access to a line in its requested state. A probe filter (more commonly called a snoop filter) functions to reduce traffic on socket-to-socket HyperTransport links by storing an index of all caches and preventing unnecessary coherency synchronization requests.

Cache subsystems 114 and 118 may comprise high speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches which are nearer processor cores 112 (within the hierarchy) may be integrated into processor cores 112, if desired. In one embodiment, cache memory subsystems 114 each represent L2 cache structures, and shared cache subsystem 118 represents an L3 cache structure.

Both the cache memory subsystem 114 and the shared cache memory sub-system 118 may include a cache memory coupled to a corresponding cache controller. For the shared cache memory subsystem 118, the cache controller may include programmable logic in order to programmably enable a storage of directory entries within locations of subsystem 118. It is noted when deployed in a single processor environment, all of the storage locations of subsystem 118 may be used for normal cache entries. When deployed in a multiple processor environment, some of the locations of subsystem 118 may be used to store directory entries. The directory entries may be maintained and accessed by a coherency control circuit for controlling coherency operations, which will be described below.

Processor cores 112 include circuitry for executing instructions according to a predefined instruction set. For example, the x86 instruction set architecture may be selected. Alternatively, the Alpha, PowerPC, x86, or any other instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller within the node to which the missing block is mapped.

As will be described in further detail below, in one embodiment of computing system 100, directory entries may be maintained to filter probe commands and response traffic for certain transactions. Rather than storing directory entries in a dedicated directory storage, directory entries may be stored in designated locations of shared cache memory subsystem 118. By utilizing shared cache memory subsystem 118 for the storage of directory entries, the need for a separate directory storage may be avoided. As a result, overall cost may be reduced, as well as required board area, power consumption, and cooling requirements. In one embodiment, an L3 cache structure may be utilized to store the directory. It is noted that High Performance Computing (HPC) applications typically do not rely on the L3 cache. Therefore, utilizing a portion of the L3 cache for storing directory entries may not impact performance.

Figure 3:
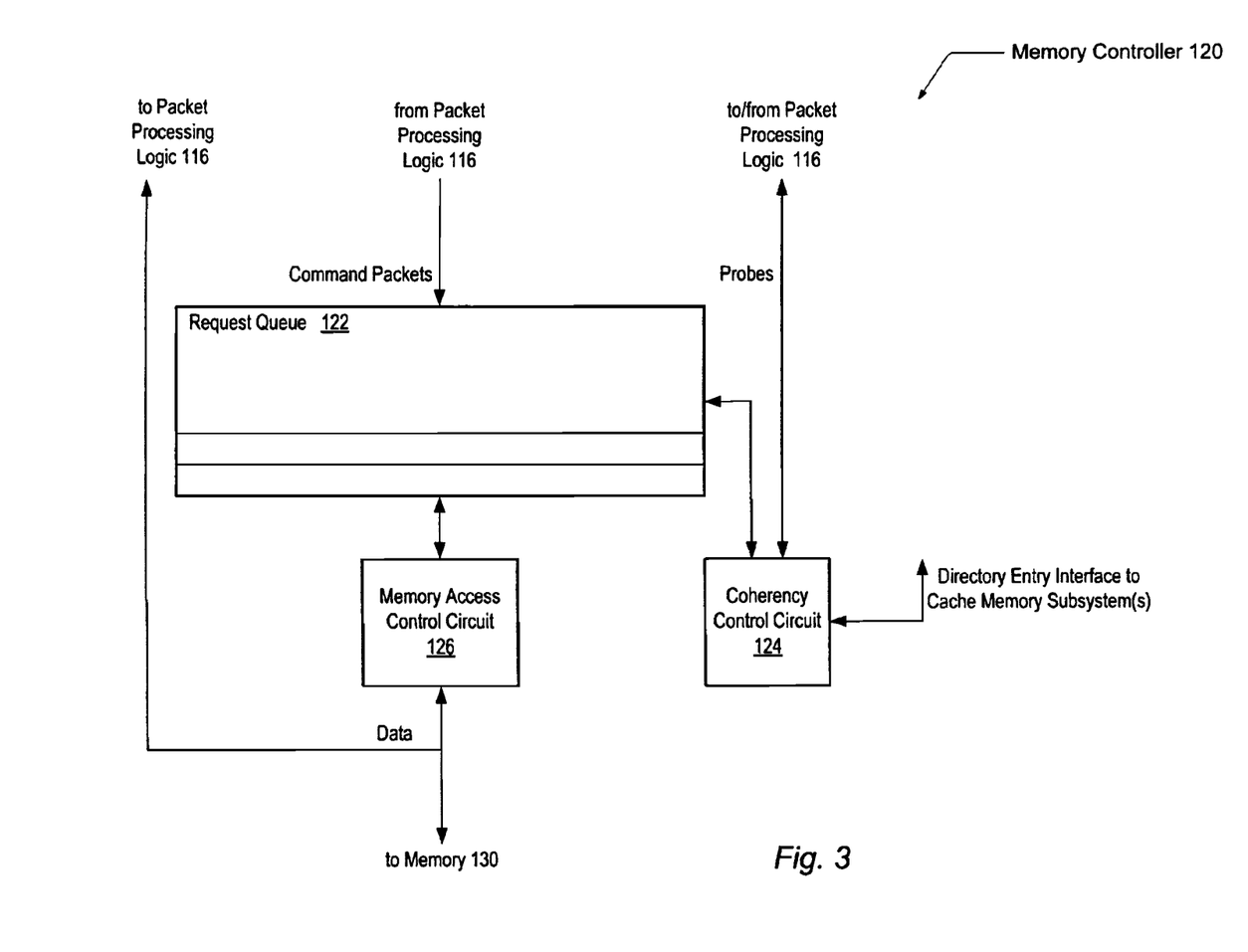
FIG. 3 is a generalized block diagram of one embodiment of a memory controller.

Turning next to FIG. 3, a block diagram of one embodiment of memory controller 120 is shown. In the embodiment of FIG. 3, memory controller 120 includes a request queue 122, a coherency control circuit 124, and a memory access control circuit 126.

Memory controller 120 receives command packets from packet processing logic 116 into request queue 122. The command packets may be routed to memory controller 120 by packet processing logic 116 if the address affected by the command corresponds to a memory location in memory 130. In other words, if the address of the command packet addresses a block stored in memory 130, the command packet is routed to memory controller 120. Memory controller 120 queues the command information in request queue 122, and subsequently processes the command. Coherency control circuit 124 ensures that the command is performed in a coherent fashion. If probes are required for the command, coherency control circuit 124 transmits a probe indication to packet processing logic 116. For example, the probe indication may include the source node and source tag from the corresponding command, the address, the type of command, and other information. Packet processing logic 116 may transmit probe commands in response to the probe indication. Coherency control circuit 124 may further receive packets that indicate a corresponding transaction has completed from packet processing logic 116, and may receive probe responses for write commands. Memory access control circuit 126 may interface with memory 130 to perform commands that are committed by coherency control circuit 124 (e.g., after coherency operations have been transmitted and any responses to be received from other nodes have been received). If the command is a read operation, data may be returned from memory 130 to packet processing logic 116 for forwarding to the source node in a response packet.

Coherency control circuit 124 is additionally configured to maintain directory entries for certain data blocks. As discussed above, these directory entries are stored, in one embodiment, within designated locations of shared cache memory subsystem 118. For this purpose, coherency control circuit 124 may include an interface to the shared cache memory subsystem 118. Coherency control circuit 124 may determine if probes are required for a command based upon the type of command and based upon the presence of a directory entry for the address specified by the command. The directory entries may contain various coherency information, depending upon the implementation. For example, a directory entry may indicate the owner of a given block, whether the block is modified in a given node, and/or the existence of nodes that have shared copies of the block. Further details regarding various exemplary directory entry formats are provided below.

In one embodiment of computing system 100, directory entries in a probe filter are used to track cache blocks which may have one of the following states: Exclusive-Modified (EM), Owned (O), Shared across two or more nodes (S), or Invalidated (I) states. The S state is a read only state. A read operation of a cache line with this state does not require probe commands to invalidate other copies of the cache line. No invalidation would be required for a read operation. However, a write operation of a cache line with an S state would require probe commands to perform a broadcast invalidation of the other copies in other processing nodes. This embodiment is a variation of the MOESI coherency protocol. It is noted that a cache block with an EM state may be indistinguishable outside a processor core and corresponding cache memory subsystem since a processor may silently transition a block from the Exclusive state to the Modified state without appropriate coherence state transition commands.

The EM directory state and the EM cache state, as used herein, are logically related but physically distinct. The EM coherence directory state indicates that a line may be in one of many possible MOESI states in caches throughout the system (as will be shown below). The EM cache state implies that a line is either in Modified (M) or Exclusive (E) MOESI cache state. Since a cache line may silently transition from cache E to cache M state (without a coherence transition to inform the coherence directory), for ease of exposition and without loss of generality, the "either E or M" cache state may also be referred to as the "EM" cache state.

The presence of a directory entry in the probe filter implies that the corresponding memory block has a copy cached. As used herein, the terms cache block and cache line are interchangeable during the below descriptions of the various embodiments. The absence of a directory entry implies the block is not stored in the cache memory subsystems 114. In one embodiment, when a coherence directory conflict miss occurs in any processing node, all corresponding directory entries in all processing nodes for the affected cache block may be updated. For example, corresponding coherence directory entries with an EM or an O state may have the data of the cache block copied back to the memory corresponding to the cache block, all other valid cache copies are invalidated, and the directory state field may transition to an I state. Corresponding coherence directory entries with an S state may not have the data of the cache block copied back to memory, the valid cache copies are invalidated, and the directory state field may transition to an I state.

Figure 4A:
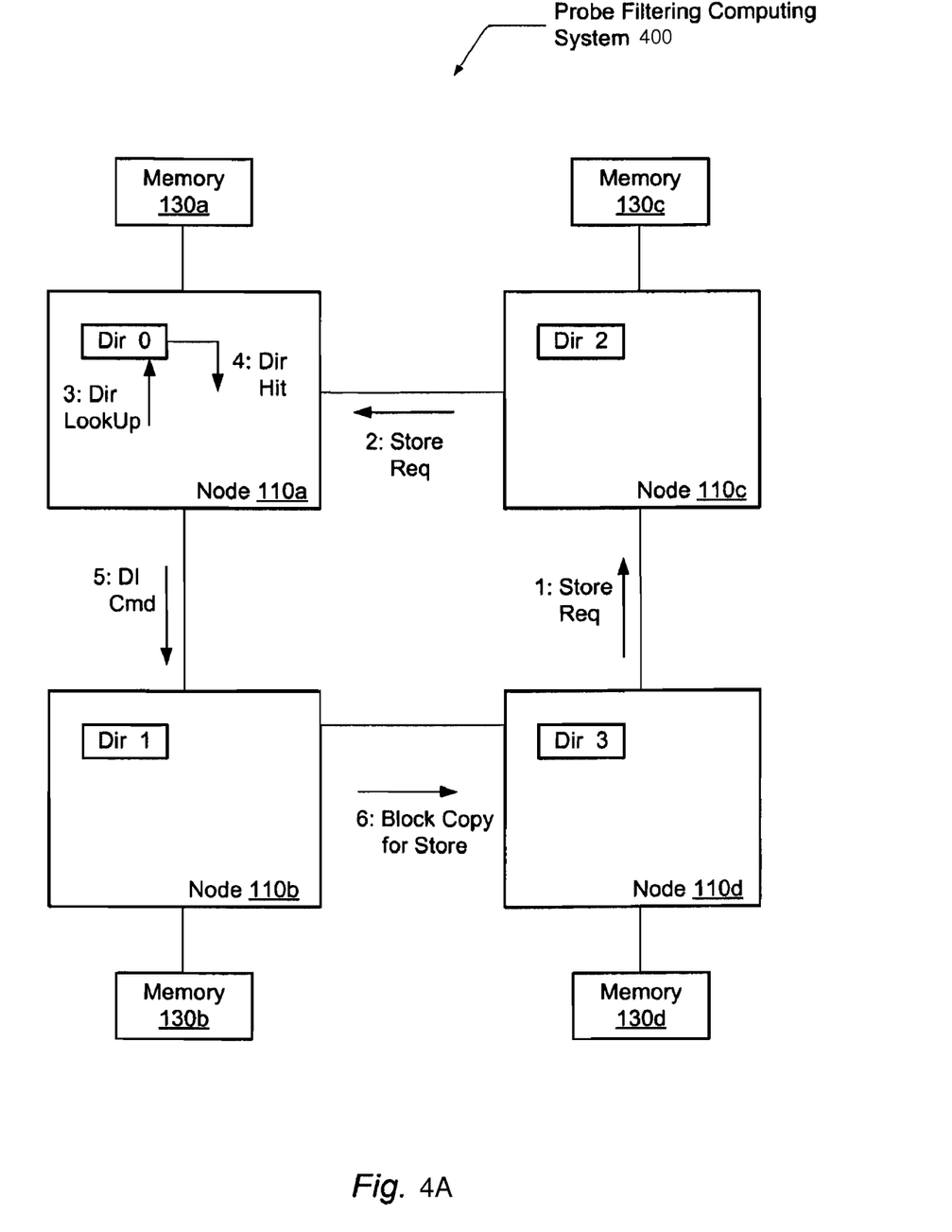
FIG. 4A is a generalized block diagram of one embodiment of a probe filtering computing system illustrating an example set of operations that requires a single probe command.

Turning now to FIG. 4A, a block diagram of one embodiment of a probe filtering computing system 400 is shown illustrating an exemplary set of operations that requires a single probe command. Circuit portions that correspond to those of FIG. 1 are numbered identically. In one embodiment, system 400 comprises four nodes 110, but alternative embodiments may comprise a different number of nodes. Directories 0-3 illustrate the directory entries that may be stored in a shared cache memory subsystem 118, such as a L3 cache, within a processing node 110. Each memory line that is stored in a cache within system 400 has a corresponding directory entry. For example, each block of data within memory 130a that is stored in a cache in system 400 has a corresponding directory entry in Dir 0. Each block of data within memory 130*b* that is stored in a cache in system 400 has a corresponding directory entry in Dir 1, and so forth.

In one embodiment, the four states for a coherence directory entry system 400 may be Invalidated (I), Owned (O), Shared within two or more nodes (S), and Exclusive-Modified (EM). Generally speaking, there may be three types of request operations that may require subsequent probe commands. These request operations may be Fetch, Load, and Store. A Fetch request may be utilized to obtain a read-only copy of a cache line. In one embodiment, an instruction cache (i-cache) may send a Fetch request. A cache that sends a Fetch request may not be relied upon to ever store a most-recent copy of a cache line. Also, this cache may not have permission to modify the cache line. A Load request is a read operation and a Store request is a write operation.

Generally speaking, a processing node 110 that issues a request may be referred to as a "Requesting" node. A processing node 110 may be referred to as a "Home" node if the memory address of the request maps to a memory 130 coupled to that processing node. A processing node may be referred to as an "Owner" node if a cache within that processing node currently stores the most recent copy of the memory block. For example, node 110*d* may issue a Load request of a block of memory with an address that maps to memory 130*a*. However, a cache within node 110*b* may store the most recent copy of the block of data. In this example, node 110*d* is a "Requesting" node, node 110*a* is a "Home" node, and node 110*b* is an "Owner" node.

The set of operations in FIG. 4A include a Store request from node 110*d*, a "Requesting" node, to a block of data with an address that maps to memory 130*a*. In this case, node 110*a* is a "Home" node. In steps 1-2, the Store request is routed from node 110*d* to node 110*a* through node 110*c*. The routing of the request through node 110*c* is illustrative and other routing alternatives may be utilized, such as routing the request through node 110*b*. Steps 3-4 include a directory lookup performed by node 110*a* (e.g., by the corresponding coherency control circuit 124 in FIG. 3). The lookup determines whether a directory entry exists in the shared cache memory subsystem 118, or Directory 0, for the requested memory block. A subsequent directory hit occurs in a corresponding entry of the shared cache memory subsystem. The directory entry indicates the block is in the EM state in processing node 110*b*, which is an "Owner" node. In step 5, the coherency control circuit 124 of processing node 110*a* accordingly causes a probe command to be forwarded to processing node 110*b*. This probe command causes node 110*b* to forward the data to processing node 110*d* in step 6. Also, the probe command may be directed invalidating (DI) the corresponding cache line in node 110*b*. The term "directed," as used herein, means that only a single node is targeted from the coherence directory perspective.

The data may be installed in a cache within node 110*d* in an EM state. The Store operation may proceed and modify the data in the corresponding cache block. The coherency control circuit 124 of node 110*a*, the "Home" node, may update the corresponding directory entry for the block to indicate the most recent copy of the cache block is now in node 110*d* with an EM state. In this case, the directory state field 464 in Directory 0 may continue indicating EM state, but the owner field 466 may be changed from indicating node 110*b* to indicating node 110*d*. In this example, since a directory hit occurred in node 110*a* with a directory entry in EM state, for a cache block in the EM state, processing node 110*a* was only required to transmit a single directed probe to one node (e.g., node 110*b*), rather than broadcast multiple probes to all nodes in system 400. When processing node 110*d* receives the data, a source done message may be transmitted from processing node 110*d* to processing node 110*a* through, for example, processing node 110*c*. This completes the transaction.

The above steps illustrated for FIG. 4A may be the same if the requested cache block had an S1 state in Directory 0. However, the update in Directory 0 would require the directory state field 464 to change from indicating S1 state to indicating EM state, while the corresponding owner field 466 still changes from indicating node 110*b* to indicating node 110*d*. It may also be required in certain cases (like this one) for a DRAM response to be generated in order to provide data to the requester. This is in contrast to the above where a DRAM response was not required since the owning node was guaranteed to respond with data (due to EM state). This can all be known based on the directory (probe filter) state.

Figure 4B:
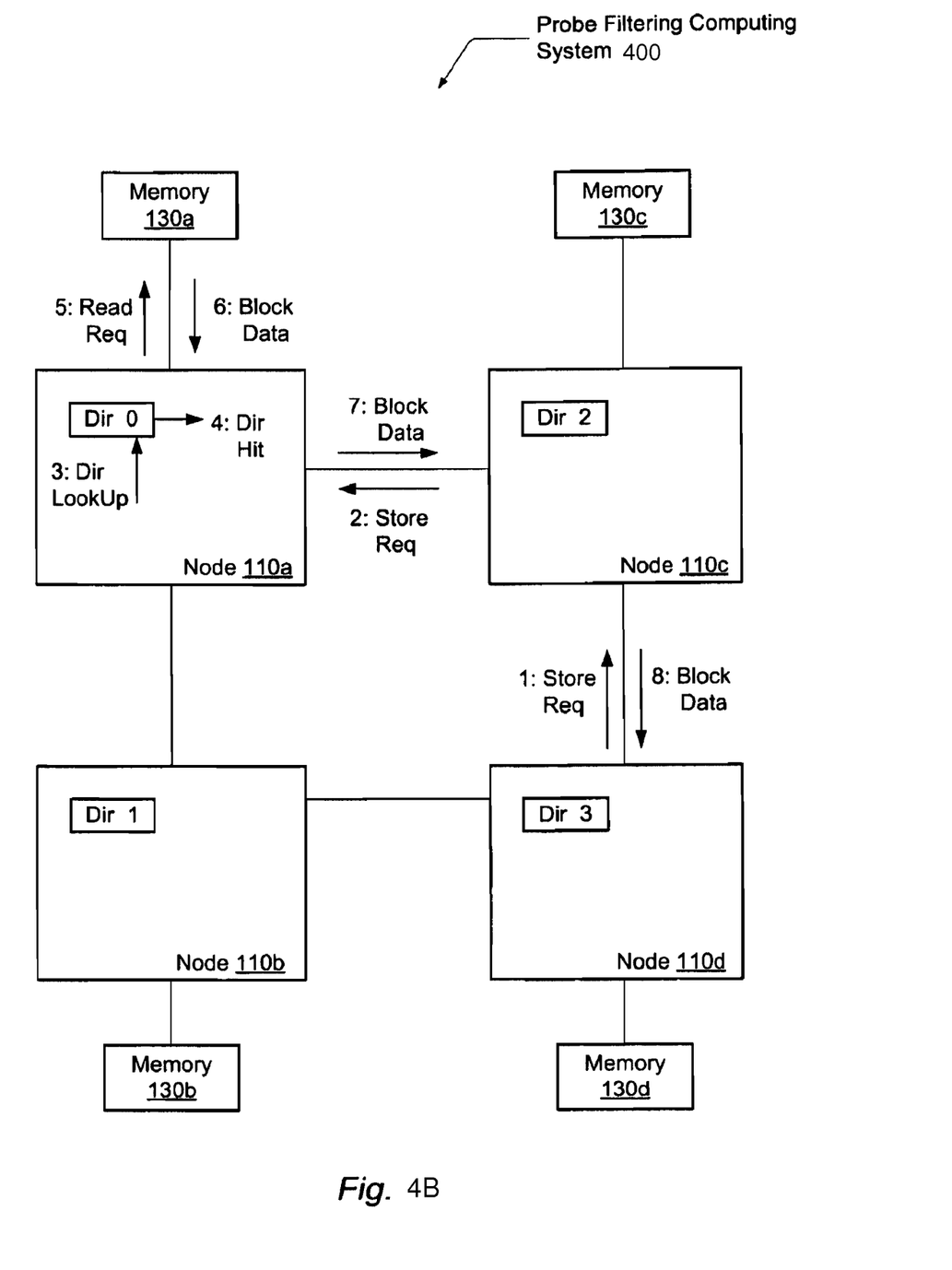
FIG. 4B is a generalized block diagram of one embodiment of a probe filtering computing system illustrating an example set of operations that requires no probe command.

FIG. 4B illustrates a similar example in which processing node 110*d*, a "Requesting" node, issues a Store request to a block of memory with an address that maps to memory 130*a*. Node 110*a* is the "Home" node. In this example, the corresponding memory block is in all caches within system 400 with an I state, i.e., corresponding memory block is not in a valid state in any system caches. In steps 1-2, the Store request is routed from node 110*d* to node 110*a* through node 110*c*. Steps 3-4 include a directory lookup performed by the corresponding coherency control circuit 124 in node 110*a*. The lookup determines whether a directory entry exists in the shared cache memory subsystem 118, or Directory 0, for the requested memory block. A subsequent directory hit occurs in a corresponding entry of Directory 0. The corresponding directory state field 464 may indicate the block is in the I state (or, in some embodiments, the lack of a directory entry may also imply the block is in the I state).

In steps 5-8, node 110*a* retrieves the requested data from memory 130*a*, and provides the data to processing node 110*d* through processing node 110*c*. The data may be installed in a cache within node 110*d* in an EM state. The Store operation may proceed and modify the data in the corresponding cache block. The coherency control circuit 124 of node 110*a*, the "Home" node, may update the corresponding directory entry for the block to indicate the most recent copy of the cache block is now in node 110*d* with an EM state. In this case, the corresponding directory state field 464 in Directory 0 may change from indicating I state to indicating EM state. The owner field 466 may be changed to indicating node 110*d*.

In this example, it is noted since a directory hit occurred in node 110*a* for a cache block in the I state, processing node 110*a* was not required to transmit any probes to any node in system 400. A directory hit on an entry with a corresponding I state may be followed by no probes being sent to any node. The same effect of no probe commands being sent results from directory misses as well. All probes are filtered during this type of directory hit regardless of the type of memory access request. Therefore, network traffic may be greatly reduced. When processing node 110*d* receives the data, a source done message may be transmitted from processing node 110*d* to processing node 110*a* through, for example, processing node 110*c*. This completes the transaction.

Figure 4C:
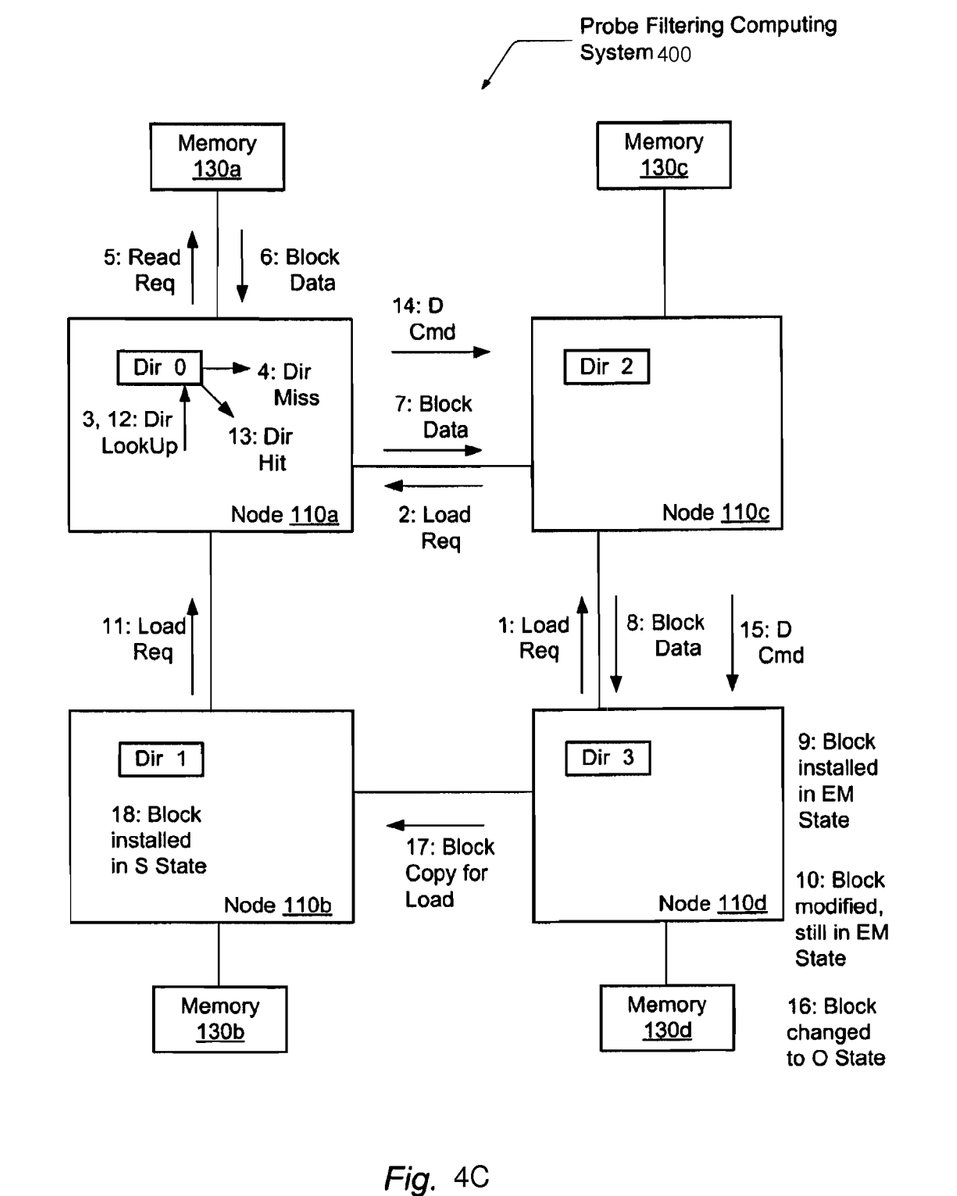
FIG. 4C is a generalized block diagram of one embodiment of a probe filtering computing system illustrating back-to-back load operations and the corresponding transmission of probe commands.

FIG. 4C illustrates an example in which processing node 110*d*, a "Requesting" node, issues a Load request to a block of memory with an address that maps to memory 130*a*. Node 110*a* is the "Home" node. In this case, the memory block is not stored in any cache in system 400. In steps 1-2, the Load request is routed from node 110*d* to node 110*a* through node 110*c*. Steps 3-4 include a directory lookup of Directory 0 performed by the corresponding coherency control circuit 124 within node 110*a*. The lookup determines whether a directory entry exists for the requested memory block in the shared cache memory subsystem 118, or Directory 0, for the requested memory block. A subsequent directory miss occurs. Since a directory entry does not exist, the memory block is not stored in a cache in system 400.

In steps 5-9, node 110a retrieves the requested data from memory 130a, and provides the data to processing node 110d through processing node 110c. The data may be installed in a cache within node 110d in an E state. The Load operation may proceed and read the data from the corresponding cache block. The coherency control circuit 124 of node 110a, the "Home" node, may enter a new corresponding directory entry for the block to indicate the most recent copy of the cache block is now in node 110d with an E state. When the new corresponding directory entry is being entered into Directory 0, a directory conflict may occur and a different directory entry may need to be evicted. Details regarding an eviction are discussed further below. The corresponding directory state field 464 in Directory 0 for the new directory entry may indicate an EM state. The owner field 466 may indicate node 110d.

It is noted since a directory miss occurred in node 110a for the requested cache block, processing node 110a was not required to transmit any probe to any node in system 400. When processing node 110d receives the data, a source done message may be transmitted from processing node 110d to processing node 110a through, for example, processing node 110c. This completes the transaction. However, later, in step 10, a processor within node 110d may modify this cache block. No coherence state change request, and therefore no directory lookup and/or probes, are sent because a silent (without coherence transaction) transition from E state to M state is allowed by the protocol. The corresponding directory entry in Directory 0 still indicates this cache block is in EM state. However, if the block is written it will transition without a coherence state change request from E state to M state in the cache as described previously.

In step 11, a Load request for the same memory block is routed from node 110b to node 110a. Steps 12-13 include a directory lookup of Directory 0 performed by the corresponding coherency control circuit 124 within node 110a. The lookup determines whether a directory entry exists for the requested memory block in the shared cache memory subsystem 118, or Directory 0, for the requested memory block. A subsequent directory hit occurs in the corresponding entry of the shared cache memory subsystem. The directory entry indicates the block is in the EM state in processing node 110d, which is the "Owner" node. In steps 14-15, the coherency control circuit 124 of processing node 110a accordingly causes a single directed probe command (D) to be forwarded to processing node 110d. This probe command causes node 110d to forward the requested data to processing node 110b in step 16. It is noted that node 110a is not required to send a broadcast of probes all nodes within system 400.

In step 17, the data may be installed in a cache within node 110b in an S state. The Load operation may proceed and read the data in the corresponding cache block. The coherency control circuit 124 of node 110a, the "Home" node, may update the corresponding directory entry for the block to indicate the most recent copy of the cache block is still in node 110d but now with an O state. In this case, the corresponding directory state field 464 in Directory 0 may change from indicating an EM state to indicating an O state. The owner field 466 continues to indicate node 110d. Also, when processing node 110b receives the data, a source done message may be transmitted from processing node 110b to processing node 110a. This completes the transaction.

It is noted that the number of probes sent in system 400 may be reduced. For purposes of discussion, the steps in the embodiments shown in FIGS. 4A-4C may occur in sequential order. However, some steps may occur in a different order than shown, some steps may be performed concurrently, some steps may be combined with other steps, and some steps may be absent in another embodiment.

A variety of other specific coherency operations may be invoked in response to other transactions initiated by a processing node. Similar to the foregoing examples, probe commands and network response traffic may be filtered based upon the existence of a directory entry for a block being accessed, and/or based upon the state of the block as indicated in a directory entry. Also, memory access latency may be reduced due to the reduction in probe commands and network response traffic. Various other specific coherency operations may similarly be performed, as appropriate, depending upon the type of transaction, the existence of a directory entry, and the state of the block in the directory entry.

Many other directory entry formats are possible in other embodiments. The specific format of a directory entry may be based on the amount of state information that is kept, the scalability of the system, and the directory storage overhead, among other factors.

Restating some of the assumptions described above, the optimized protocol (always migrate) works for multi-level shared cache hierarchies. However, for ease of exposition, each processor is assumed to have its own cache, and each cache as being a single "node." A "node" is designated as a domain of potentially multiple caches but which can be targeted independently by the directory protocol. Where applicable, the state relationships between the directory and caches that allow for multi-level shared cache hierarchies are illustrated.

Cache states include:

M: Modified (cache block is only present in 1 cache, memory is not up-to-date and this copy must be written back to memory when evicted from cache, read/write permission is sufficient);

O: Owned (cache block may be present in many caches, memory is not up-to-date and this copy must be written back to memory when evicted from cache, read-only permission is sufficient);

E: Exclusive (cache block is only present in 1 cache, memory is up-to-date, read/write permission is required; Write must transition to M state but can do so without an externally visible coherence transition). Although cache M and cache E states are separate (as shown here), in many previous introductory examples these states were combined together and called the "cache EM" state because the coherence directory cannot distinguish them (see below in Directory States);

S: Shared (cache block may be present in many caches, memory may or may not be up-to-date but this copy need not be written back to memory when evicted from cache, read-only permission is sufficient);

I: Invalid; or

Muw: ModifiedUnWritten (cache block is only present in one cache, memory is not up-to-date and this copy must be written back to memory when evicted from cache, read/write permission is necessary; Write must transition to M state but can do so without an externally visible coherence transition).

M and Muw differ in how the coherence protocol behaves in response to external Migrate probes. In the case of M state, an external Migrate probe causes a transition from M->I and a Muw line is installed in the requester. In the case of Muw state, an external Migrate probe causes a transition from Muw->O and an S line is installed in the requester in prior state of the art protocols which support migratory sharing optimization (Muw state). This difference in external probe handling is a key part of the protocol to allow widely-shared data (a write followed by reads from many other processors) to lead to a readable copy in all caches. In the currently described invention, the so-called always migrate protocol, the transition in this case is from Muw->S and an O Line is installed in the requester. In prior state of the art protocols, the directory must be looked up and updated in a non-atomic method leading to additional "Pending" states which may lead to significant difficulty in protocol implementation, more race conditions, and the like.

The always migrate protocol avoids the Pending states by always migrating ownership of the data regardless of whether the Migrate probe hits M, O, E, or Muw in the cache, easing implementation significantly.

Transactions (these occur from the requesting CPU to the home node/directory) types include:

RdBlk: ReadBlock command. A load instruction attempts to execute. It requires a copy of the cache line for read permission (E or Muw data return is allowed);

CtoD: ChangeToDirty command. A store instruction attempts to execute.

The requesting cache has a copy of the line, but does not have write permission (O or S state) and needs to request write permission from the system;

RdBlkM: ReadBlockModified command. A store instruction attempts to execute. The requesting cache does not have a copy of the line (it is in I state) and requires both data and write permission from the system;

SrcDone: A response from the requesting node once it has received all responses back to the home node/directory indicating the transaction is complete. In the always migrate version of the protocol, no information must be carried to handle Muw cache lines. Conventional systems carry additional status information about the install state which updates the directory, leading to additional Pending states in the directory and non-atomic directory transactions.

Directory Probe Types are generated based on the directory state and Transaction type and include:

None: No probe required; Directory may deliver data to requester from memory with requested permission and determine the directory state based on only directory state and Transaction type;

Directed Shared: A probe for a read-only copy of the data toward a single owner of the data; this owner must be in M, O, E, Muw states (so it responds with data). Memory data is not returned;

Directed Invalidating: A probe for a writeable copy of the data toward a single owner node of the data; this owner must be in M, E, Muw states (so it responds with data, and the data must be unique so that probe to a single owner is capable of invalidating all valid cached copies). With multi-level shared hierarchies, there may be an O state copy along with multiple S-state copies, but in this case, any valid copies are only within the owner node. Memory data is not returned; or Broadcast Invalidating: A probe for a writeable copy of the data to all CPUs in the system; the data may be in multiple caches, the directory state must indicate whether memory is up-to-date or whether an owner exists that will return data. The memory responds with data or with an appropriate message (not shown) indicating whether memory data or cache data will be returned from an M, O, E, or Muw copy in the system.

A Directory Owner is a node which owns the cache block. This is the node which is targeted for "Directed" probes (Directed Shared, Directed Invalidating) that probe only a single node in the system.

Example Directory States for the present invention include:

M: Cache line is M, O, E, or Muw in one node in the system; if the cache state is O, the line may only be present in other caches on a single node (the owner node) in an S state; the Directory owner points to the M, O, E, or Muw node;

O: When the directory state is O, cache MOESI states may be M, O, or Muw on a single node. If there is a cache in the system that is in O state, it is legal for any number of other caches in the system to be S (including caches on the same node or different nodes than the directory owner). The directory always points to the node which has the cache with the M, Muw, or O copy, and in the node that is pointed to by the directory, there must be an M, Muw, or O copy;

S: Same as conventional systems;

I: Same as conventional systems.

In order to enable the optimizations of the present invention, cache "castouts" (victims) of M, O, E, Muw data must be sent to the directory with the M, O, E, Muw states differentiated. This allows the Directory State "O" to transition to I when an M or Muw line is cast out from the processor/node optimizing directory performance. Since the directory is already informed about all of these castouts, and needs perform a directory lookup and update for updating the directory, this does not impose additional overhead or complexity.

Thus, the conventional protocol is modified to allow M and Muw lines to hide under the Directory State "O" at a performance tradeoff. Always migrating ownership (for a Migrate probe), in concert with the methods described above, allows for atomic directory update (no "Pending" state) and no information is required to be sent for a directory update from the SrcDone (e.g., a Transaction completion message) as will be described more fully below.

Atomic update of directory state (without feedback from the SrcDone) vastly simplifies implementation and reduction to practice. The new always migrate (optimized) protocol is compatible with both broadcast-based and directory-based systems without significant modifications. Many conventional protocols required explicit (additional) directory states to track migratory behavior. The optimized protocol does not require explicit counting of the number of sharers. The optimized protocol (as defined) is compatible with multi-level cache hierarchies with groups of caches inside a coherent "node" performing standard MOESI-compatible state transitions. No messages need be sent to the directory in response to these internal transitions.

In the examples that follow: "->" indicates a transition; and "(MOESI transition)" indicates a state change that may occur without sending a coherence Transaction, i.e., an internal cache state transition; and "NC" indicates "no change."

In the following examples, a table starts with a constant set of CPU Load and Store requests to a given cache line. Between each example, for the same set of Load and Store requests, different coherence transaction handling and/or cache state transitions are shown. The differences in the cache state transitions, coherence transactions, probe types, directory states, and directory owners (in each scheme) between the examples are shown and discussed. In different sets of examples, the set of CPU Load and Store requests may change in order to illustrate a particular issue to be conveyed.

Although each row of an example is shown as a set of atomic transactions, within each row, there is an implied ordering of events as is common in many processing systems for simplicity of representation to reducing the size of the tables. All actions in the prior row are assumed to complete before the start of actions in the next row (for example, the SrcDone transaction, which signals completion of the prior transaction, is fundamentally required before the next transaction on the same cache line can begin on behalf of a different processor, if the events are ordered by the memory controller; this is common to many multiprocessor systems with home-node ordering). The ordering of events is for illustrative purposes only—in certain systems the ordering and/or concurrency of specific events may be different and does not fundamentally influence the invention. An example ordering of events within a row is as follows:

(1) A load or store request from the given CPU is encountered;

(2) In response to that request, the Cache is interrogated (in all examples a cache state transition is required);

(3) The indicated transition may or may not lead to a Transaction (observable by the coherence fabric). When no transaction is required, indicated by "( )" around the Cache transition, the activity on that row is complete;

(4) If a Transaction is necessary, it is sent to the home node memory controller and directory in order to be serialized behind other requests from other processors for the same cache line (to maintain coherence order);

(5) A directory lookup is performed to determine the current state of the cache line in the directory (shown on the left side if the X->Y Directory State, (i.e., the state observed is X and, based on the Directory State and received Transaction, a transition to Directory State Y occurs, wherein X and Y represent directory states);

(6) As a function of the Directory State X and the Transaction, a probe may be generated as shown below in Directory Probe Type column;

(7) Coincident with the probe generation, a Directory State and Directory Owner transition may also occur as shown below;

are received, the requesting CPU Cache transition (from A->B, shown in the "Cache" column, wherein A and B are states) may occur;

(10) In cases where there are no probes ("None" in Directory Probe type), or, for broadcast probes, a response from the home node memory (where the Directory resides) is also delivered and is not shown. This response delivers memory data or another response from the home node, indicating that the memory response portion for that transaction is complete. This behavior is not central to the optimized protocol. The memory response may include memory data and/or an indication from the directory based on the initial directory state X (not shown) as to how many probe responses, if any, should be expected at the requesting CPU, before the transaction can be completed at the requesting CPU;

(11) A SrcDone response may be generated after all responses from caches and/or memory is received, and the SrcDone response sent back to the home node and directory. In the optimized protocol (always migrate) of the present invention, the SrcDone does not need to carry information. In conventional solutions, the SrcDone had to carry information, namely the eventual MOESI cache install state of the transaction, in order to provide the desired functionality. That information was carried by the aggregation of all probe responses and directory responses and then relayed back to the directory for final directory state update. Illustrating examples are shown in Table 3 and Table 4 below. A comparison to the present invention, where such information is not required, greatly simplifying implementation is also shown below;

(12) In cases where a directory transition is shown as part of the SrcDone, it occurs after the SrcDone is received at the home node directory; and (13) Once the SrcDone is received at the home node (and any directory updates it may require are complete), the next Transaction to the same cache line may proceed.

Table 1 is a conventional example of migratory pattern handling.

| Row # | CPU 0 | Cache | Transaction | CPU 1 | Cache | Transaction | CPU 2 | Cache | Transaction | Directory Probe Type | Directory State | Directory Owner |
|---|---|---|---|---|---|---|---|---|---|---|---|---|
| 1 | Load [A] | I->E | RdBlk | | | | | | | None | I->M | CPU 0 |
| 2 | | | SrcDone | | | | | | | NC | NC | |
| 3 | Store [A] | (E->M) | NA | | | | | | | | | |
| 4 | | | NA | | | | | | | | | |
| 5 | | M->O | | Load [A] | I->S | RdBlk | | | | Directed Shared | M->O | CPU 0->CPU 0 |
| 6 | | | | | | SrcDone | | | | NC | NC | |
| 7 | | O->I | | Store [A] | S->M | CtoD | | | | Broadcast Invalidating | O->M | CPU 0->CPU 1 |
| 8 | | | | | | SrcDone | | | | NC | NC | |
| 9 | | | | | M->O | | Load [A] | I->S | RdBlk | Directed Shared | M->O | CPU 1->CPU 1 |
| 10 | | | | | | | | | SrcDone | NC | NC | |
| 11 | | | | | O->I | | Store [A] | S->M | CtoD | Broadcast Invalidating | O->M | CPU 1->CPU 2 |
| 12 | | | | | | | | | SrcDone | NC | NC | |

(8) The probe is delivered to Caches in the system, and the cache transitions on the non-requesting CPUs occur, wherein the transitions correspond to the Directory Probe Type;

(9) Probe responses (if necessary) are delivered from each probed CPU to the requesting processor; once all responses In this example, each SrcDone line has no change (NC) for Directory State and Directory Owner. This reinforces a key precept of the Always Migrate protocol, which is an atomic lookup (for Directory Probe Type generation), Directory State and Directory Owner update. In rows 7 and 11 CtoD Transactions (with probes and Directory state changes) are shown which are optimized in the present invention with the combination of the Muw state and migratory handling.

Table 2 is an example of migratory pattern handling with Muw as implemented in the present invention:

| Row # | CPU 0 | Cache | Trans-action | CPU 1 | Cache | Trans-action | CPU 2 | Cache | Trans-action | Directory Probe Type | Directory State | Directory Owner |
|---|---|---|---|---|---|---|---|---|---|---|---|---|
| 1 | Load [A] | I->E | RdBlk | | | | | | | None | I->M | CPU 0 |
| 2 | | | SrcDone | | | | | | | | NC | NC |
| 3 | Store [A] | (E->M) | NA | | | | | | | | | |
| 4 | | | NA | | | | | | | | | |
| 5 | | M->I | | Load [A] | I->Muw | RdBlk | | | | Migrate | M->O | CPU 0->CPU 1 |
| 6 | | | | | | SrcDone | | | | | NC | NC |
| 7 | | | | Store [A] | (Muw->M) | NA | | | | | | |
| 8 | | | | | | NA | | | | | | |
| 9 | | | | | M->I | | Load [A] | I->Muw | RdBlk | Migrate | O->O | CPU 1->CPU 2 |
| 10 | | | | | | | | | SrcDone | | NC | NC |
| 11 | | | | | | | Store [A] | (Muw->M) | NA | | | |
| 12 | | | | | | | | | NA | | | |

In this embodiment, rows 7 and 11 now have no associated Transaction, Probes, and Directory updates implying improved latency and reduced coherence traffic for the store commands. The internal state transition from Muw->M is also shown. This clearly shows the advantage of a protocol optimized for Migratory Sharing (via the Muw state) to reduce coherence state transitions for migratory (read followed by write) patterns.

(2) Reduction in broadcast coherence messages (both with and without the Probe Filter, since the existing Probe Filter will always broadcast for migratory patterns) which reduces HT BW needs and improves system scalability.

These optimizations are increasingly important as the number of cores in the system increase.

Table 3 is an example of the handling of a migratory pattern with previous state-of-the-art proposals incorporating Muw.

| Row # | CPU 0 | Cache | Trans-action | CPU 1 | Cache | Trans-action | CPU 2 | Cache | Trans-action | Directory Probe Type | Directory State | Directory Owner |
|---|---|---|---|---|---|---|---|---|---|---|---|---|
| 1 | Load [A] | I->E | RdBlk | | | | | | | None | I->M | CPU 0 |
| 2 | | | SrcDone | | | | | | | | NC | NC |
| 3 | Store [A] | (E->M) | NA | | | | | | | | | |
| 4 | | | NA | | | | | | | | | |
| 5 | | M->I | | Load [A] | I->Muw | RdBlk | | | | Migrate | M->Pending | CPU 0->Pending |
| 6 | | | | | | SrcDone (Muw) | | | | | Pending->M | Pending->CPU 1 |
| 7 | | | | Store [A] | (Muw->M) | NA | | | | | | |
| 8 | | | | | | NA | | | | | | |
| 9 | | | | | M->I | | Load [A] | I->Muw | RdBlk | Migrate | M->Pending | CPU 1->Pending |
| 10 | | | | | | | | | SrcDone (Muw) | | Pending->M | Pending->CPU2 |
| 11 | | | | | | | Store [A] | (Muw->M) | NA | | | |
| 12 | | | | | | | | | NA | | | |

Accelerating data accesses leads to at least two major benefits:

(1) Reduction in memory write latency, including critical state change latency for LOCKed operations (LOCKed operations cannot be treated as separated load-op-stores where the store can drop into the post retire store buffer waiting for the state change to finish; thus, avoiding the state change directly impacts load latency as well);

This example shows the same traffic pattern as shown above as handled by the conventional systems. In row 6 and row 10, the Directory transitions depend on the SrcDone information in order to complete the directory state transition (update the state, update CPU 2). The Example shown by Table 4 below demonstrates why the transaction must be split (and why a Pending state is required). However, lines 7 and 11 show that reduced coherent traffic for store commands (and the like) is still achieved.

Table 4 shows an example migratory pattern of a conventional system with Muw (e.g., why Pending state and SrcDone update is required).

| Row # | CPU 0 | Cache | Transaction | CPU 1 | Cache | Transaction | CPU 2 | Cache | Transaction | Directory Probe Type | Directory State | Directory Owner |
|---|---|---|---|---|---|---|---|---|---|---|---|---|
| 1 | Load [A] | I->E | RdBlk | | | | | | | None | I->M | CPU 0 |
| 2 | | | SrcDone | | | | | | | | NC | NC |
| 3 | Store [A] | (E->M) | NA | | | | | | | | | |
| 4 | | | NA | | | | | | | | | |
| 5 | | M->I | | Load [A] | I->Muw | RdBlk | | | | Migrate | M->Pending | CPU0->Pending |
| 6 | | | | | | SrcDone (Muw) | | | | | Pending->M | Pending->CPU 1 |
| 7 | | | | Store [A] | (Muw->M) | NA | | | | | | |
| 8 | | | | | | NA | | | | | | |
| 9 | | | | | M->I | | Load [A] | I->Muw | RdBlk | Migrate | M->Pending | CPU 1->Pending |
| 10 | | | | | | | | | SrcDone (Muw) | | Pending->M | Pending->CPU2 |
| 11 | | | | Load [A] | I->S | RdBlk | | Muw->O | | Migrate | M->Pending | CPU2->Pending |
| 12 | | | | | | SrcDone (S) | | | | | Pending->O | Pending->CPU2 |
| 13 | Store [A] | I->M | RdBlkM | | S->I | | | O->I | | Invalidating | O->M | CPU2->CPU0 |
| 14 | | | SrcDone | | | | | | | | NC | NC |
| 15 | | M->I | | Load [A] | I->Muw | RdBlk | | | | Migrate | M->Pending | CPU0->Pending |
| 16 | | | | | | SrcDone (Muw) | | | | | Pending->M | Pending->CPU 1 |
| 17 | | | | | | | Store [A] | I->M | RdBlkM | Directed Invalidating | M->M | CPU 1->CPU 2 |
| 18 | | | | | | | | | SrcDone | | NC | NC |

In rows 5 and 11, the Transaction and Directory State (RdBlk, M state) at the start of the transaction are the same, but the ending state in rows 6 and 12 are different (M in line 6 and O in line 12). This illustrates the need for the non-atomic directory lookup and update with information from the SrcDone required for the update.

Line 17 shows a possible advantage of this protocol over the present invention, demonstrating that conventional solutions teach away from the optimized protocol of the present invention. Conventional methods typically assume precise directory state tracking, and thus can send a Directed Invalidating probe for the sequence of transactions shown from rows 13-17 (an M line in another cache followed by a RdBlk which leaves the line in Muw followed by another RdBlkM). In this scenario, the Muw state in the cache is always beneath an M Directory State, allowing the Directed Invalidating Probe.

Table 5 below shows a key difference in the present invention.

Table 5 shows an example of previous set of transactions using the methods of the present invention.

| Row # | CPU 0 | Cache | Transaction | CPU 1 | Cache | Transaction | CPU 2 | Cache | Transaction | Directory Probe Type | Directory State | Directory Owner |
|---|---|---|---|---|---|---|---|---|---|---|---|---|
| 1 | Load [A] | I->E | RdBlk | | | | | | | None | I->M | CPU 0 |
| 2 | | | SrcDone | | | | | | | | NC | NC |
| 3 | Store [A] | (E->M) | NA | | | | | | | | | |
| 4 | | | NA | | | | | | | | | |
| 5 | | M->I | | Load [A] | I->Muw | RdBlk | | | | Migrate | M->O | CPU0->CPU1 |
| 6 | | | | | | SrcDone | | | | | NC | NC |
| 7 | | | | Store [A] | (Muw->M) | NA | | | | | | |
| 8 | | | | | | NA | | | | | | |
| 9 | | | | | M->I | | Load [A] | I->Muw | RdBlk | Migrate | O->O | CPU1->CPU2 |
| 10 | | | | | | | | | SrcDone | | NC | NC |
| 11 | | | | Load [A] | I->O | RdBlk | | Muw->S | | Migrate | O->O | CPU2->CPU1 |

| Row # | CPU 0 | Cache | Transaction | CPU 1 | Cache | Transaction | CPU 2 | Cache | Transaction | Directory Probe Type | Directory State | Directory Owner |
|---|---|---|---|---|---|---|---|---|---|---|---|---|
| 12 | | | | | | SrcDone | | | | | NC | NC |
| 13 | Store [A] | I->M | RdBlkM | | O->I | | | S->I | | Invalidating | O->M | CPU1->CPU0 |
| 14 | | | | | | SrcDone | | | | | NC | NC |
| 15 | | M->I | | Load [A] | I->Muw | RdBlk | | | | Migrate | M->O | CPU0->CPU1 |
| 16 | | | | | | SrcDone | | | | | | |
| 17 | | | | | | | Store [A] | I->M | RdBlkM | Broadcast Invalidating | O->M | CPU1->CPU2 |
| 18 | | | | | | | | | SrcDone | | NC | NC |

In line 17, a key tradeoff of the present invention is observable. For this scenario (evaluated with performance simulation) the present invention sends a Broadcast Invalidating Probe in lieu of a Directed Invalidating Probe. Since probes are sent in both cases, the latency of the transaction is similar, although the coherence bandwidth is larger in the present invention. As illustrated, however, the present invention may make all Directory State and Directory Owner updates atomically and thus no information is required from the SrcDone.

Table 6 is an example demonstrating why the Muw state is required and why the migratory sharing optimizations provided by conventional solutions and the current invention (always migrate solution) do not use the cache M state as the install state for RdBlk transactions and Migratory probes in place of the Muw state installation. The example demonstrates a write-once read-many scenario with the new optimized protocol.

| Row # | CPU 0 | Cache | Transaction | CPU 1 | Cache | Transaction | CPU 2 | Cache | Transaction | Directory Probe Type | Directory State | Directory Owner |
|---|---|---|---|---|---|---|---|---|---|---|---|---|
| 1 | Load [A] | I->E | RdBlk | | | | | | | None | I->M | CPU 0 |
| 2 | | | SrcDone | | | | | | | | NC | NC |
| 3 | Store [A] | (E->M) | NA | | | | | | | | | |
| 4 | | | NA | | | | | | | | | |
| 5 | | M->I | | Load [A] | I->Muw | RdBlk | | | | Migrate | M->O | CPU 0->CPU 1 |
| 6 | | | | | | SrcDone | | | | | NC | NC |
| 9 | | | | | Muw->S | | Load [A] | I->O | RdBlk | Migrate | O->O | CPU 1->CPU 2 |
| 10 | | | | | | | | | SrcDone | | NC | NC |
| 11 | | | | Load [A] | Cache Hit | | Load [A] | Cache Hit | | | | |
| 12 | | | | | | | | | | | | |

In row 11, both CPU 1 and CPU 2 have a readable copy of the cache line. This implies that the initial store from CPU 0 (in row 3) may be replicated in all processors in the system which is critical for write-once-read-many data patterns (such as a contested spin lock). If the cache install state in row 5 had been M state, the Directory State and future Migrate probes would lead to a situation where the desirable state in row 11 could not be achieved, leading to significant performance problems for such data patterns.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement the present invention.

Embodiments of the invention may be represented as instructions and data stored on a computer readable memory. For example, aspects of the invention may be included in a hardware description language (HDL) code stored on such computer readable media. Such instructions, when processed may generate other intermediary data (e.g., netlists, GDS data, or the like) that can be used to create mask works that are adapted to configure a manufacturing process (e.g., a semiconductor fabrication facility). Once configured, such a manufacturing process is thereby adapted to manufacture processors or other semiconductor devices that embody aspects of the present invention.

Suitable processors include, by way of example, a general purpose processor, a special purpose processor, a conventional processor, a digital signal processor (DSP), a plurality of processors, one or more processors in association with a DSP core, a controller, a microcontroller, application specific integrated circuits (ASICs), graphics processing units (GPUs), field programmable gate arrays (FPGAs) circuits, any other type of integrated circuit (IC), and/or a state machine.

What is claimed is:

1. A method for shared data management in a processor comprising:
   hitting a directory entry in a first state for a read block command, wherein the first state is a modified (M) state or owned (O) state;
   generating a migratory probe based on the first state and the command;
   transitioning the directory entry to an O state if the first state is the M state or maintaining the directory entry as an O state if the first state is an O state; and
   sending a source done command to indicate a completed transaction without sending cache block ownership information or cache state information to the directory.

2. The method of claim 1 further comprising:
   on a condition that the migratory probe hits M, O, exclusive (E), or ModifiedUnWritten (Muw) cache line state, obtaining a copy of the cache line, by a requestor, in the Muw or O cache line state;
   updating the state to an invalid (I) or shared (S) based on the migratory probe and the cache line state; and
   maintaining cache consistency based on the transitioning.

3. The method of claim 2, wherein an O directory state hides a cache line state, wherein status information is sent to the directory upon an eviction.

4. The method of claim 3, wherein the status information includes at least one of cache state of the eviction, an eviction type, or combined evictions.

5. An apparatus comprising:
   a processor configured to hit a directory entry in a first state for a read block command, wherein the first state is a modified (M) state or owned (O) state;
   a probe generating component configured to generate a migratory probe based on the first state and the read block command;
   a controller configured to transition the directory entry to an O state if the first state is the M state or maintaining the directory entry as an O state if the first state is an O state; and configured to send a source done command to indicate a completed transaction without sending cache block ownership information or cache state information to the directory.

6. The apparatus of claim 5 further comprising:
   on a condition that the migratory probe hits M, O, exclusive (E), or ModifiedUnWritten (Muw) cache line state, the processor further configured to obtain a copy of the cache line in Muw or O cache line state;
   a state updating component configured to update the state to an invalid (I) or shared (S); and
   wherein the apparatus is configured to maintain cache consistency.

7. The apparatus of claim 6, wherein an O directory state hides a cache line state, wherein status information is sent to the directory upon an eviction.

8. The apparatus of claim 7, wherein the status information includes at least one of cache state of the eviction, an eviction type, or combined evictions.

* * * * *